United States Patent

[11] 3,593,804

| [72] | Inventor | Roy S. Snider<br>3950 Burke Ave. N.E., Louisville, Ohio 44641 |
|---|---|---|
| [21] | Appl. No. | 625,699 |
| [22] | Filed | Mar. 24, 1967 |
| [45] | Patented | July 20, 1971 |

[54] POWER CULTIVATOR
1 Claim, 5 Drawing Figs.

[52] U.S. Cl. .................................................. 172/100,
299/83, 37/2 R, 37/191 A, 143/32 C, 143/32 L
[51] Int. Cl. ........................................................ A01b 35/28
[50] Field of Search .......................................... 37/2, 190,
191, 192, 86, 86 A, 86 S; 143/32, 32.10, 32.11,
135; 83/661; 299/83, 89, 92; 172/100

[56] References Cited
UNITED STATES PATENTS

| 1,469,132 | 9/1923 | Wilson | 299/83 |
| 1,634,643 | 7/1927 | Bens | 143/135 |
| 1,979,001 | 10/1934 | Kankos | 143/135 |
| 2,755,828 | 7/1956 | Dunnington | 143/135 |
| 2,798,517 | 7/1957 | Carney | 143/135 |
| 3,123,110 | 3/1964 | Keway | 143/135 |
| 2,991,571 | 7/1961 | Hyster | 37/191 A |
| 3,006,087 | 10/1961 | Lindell | 37/86 |
| 3,024,546 | 3/1962 | Cramer | 37/191 A |
| 3,382,898 | 5/1968 | Walker | 143/32.11 |

*Primary Examiner*—Edgar S. Burr
*Attorney*—Frease and Bishop

ABSTRACT: A portable power operated cultivating and digging machine preferably incorporating a gasoline engine as the prime mover. The engine drives a pulley and belt assembly which in turn drives a sprocket. An endless chain and second sprocket are driven by the first sprocket, the chain carrying a series of compound digging teeth. A backing and chain bearing assembly is mounted between the two sprockets.

PATENTED JUL20 1971
3,593,804
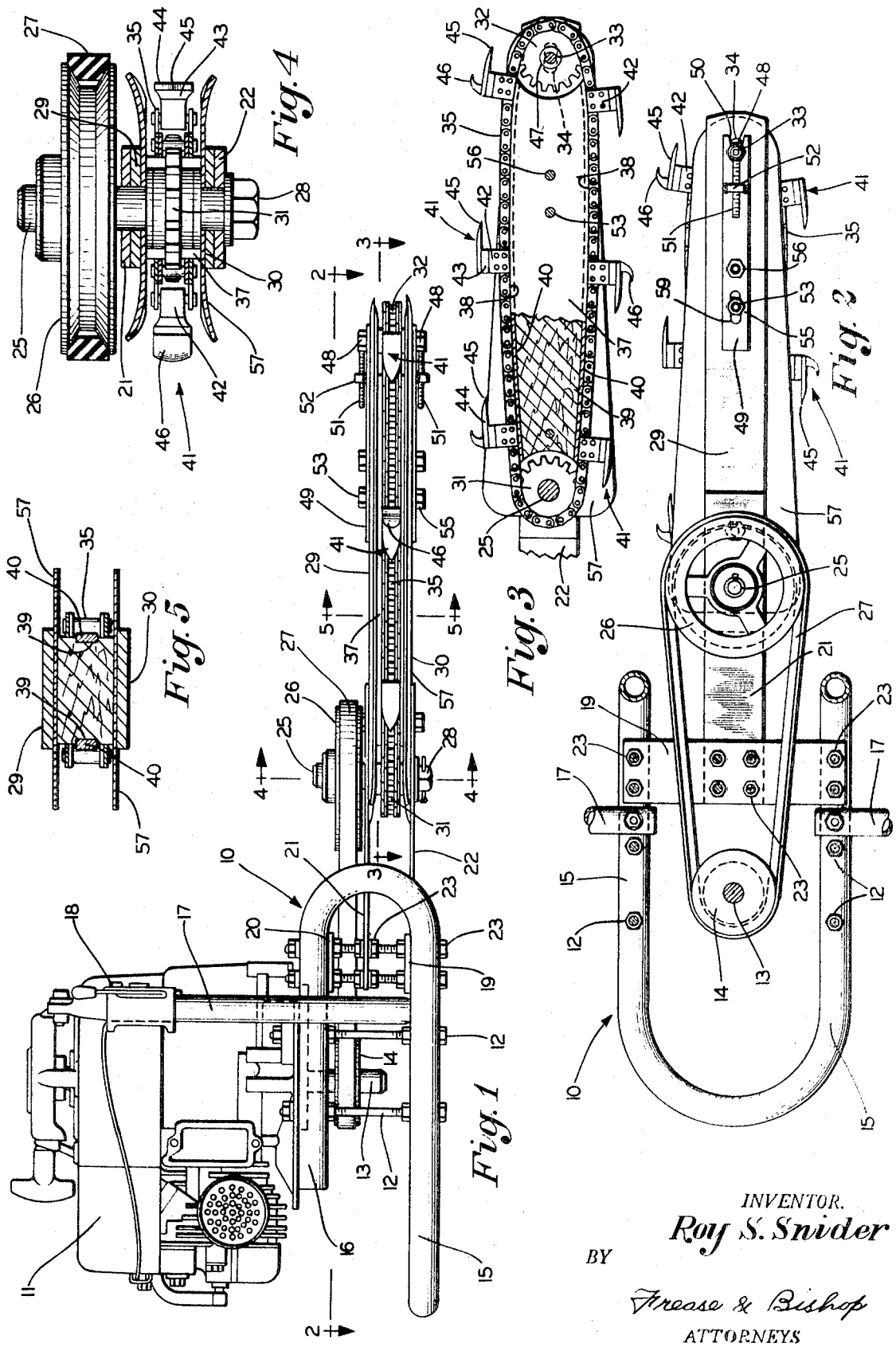
INVENTOR.
Roy S. Snider
BY
Frease & Bishop
ATTORNEYS

POWER CULTIVATOR

BACKGROUND OF THE INVENTION

1. Field of the Invention

The invention relates to power operated digging equipment and more particularly to a portable, preferably gasoline powered, endless chain digger and cultivator.

2. Description of the Prior Art

Prior constructions of endless chain type cutting and digging machines have been provided with a series of cutting teeth mounted on the chain. A well-known example of this type of device is the common chain saw. Such prior constructions have certain disadvantages as well as certain inherent deficiencies. Chain saws are specifically designed to cut wood and the cutting tooth construction is not suitable nor efficient for digging and removing quantities of dirt.

Power operated machines have been provided for cultivating and digging earth and coal, however such machines have normally included either a blade type of tooth device or a simple pointed tooth. The blade type tooth device operates in the manner of a spade or shovel or hoe, while the pointed type device is designed to cut through a hard material like coal.

Furthermore, most of the power operated digging machines which incorporate an endless chain are designed with the chain in a generally vertical plane. These machines are frequently mounted on wheels and thus operate much in the manner of a small trenching machine. Such machines are useful for their intended purposes, however, there are numerous jobs which they cannot perform. For example, nurserymen often dig large numbers of bushes, shrubs and trees from their grounds for transplanting at other locations. Wheel mounted trenching machines are not suitable for such jobs.

SUMMARY OF THE INVENTION

Objectives of the invention include the provision of a portable, hand operated digging and cultivating machine, the provision of a unique set of cutting teeth for such a machine, and the provision of a unique means of chain mounting construction assembly. Other objects and advantages may be obtained from the following general statement, detailed description and claims.

The power cultivator construction of the present invention may be stated in general terms as including a frame having a gasoline powered engine mounted thereon, an engine drive shaft having pulley means mounted thereon, a second pulley mounted on the frame by second shaft means, a sprocket mounted on the second shaft, a second sprocket mounted on frame and spaced outwardly from the engine, pulleys and first sprocket, an endless chain extending between the two sprockets, belt means extending between the two pulleys, and driving the second pulley and the first sprocket, the pulley driven sprocket driving the endless chain, a backing member extending between the two sprockets and having chain bearing means mounted thereon, and cutting teeth mounted on the chain, said teeth including at least one compound form tooth having a longitudinal portion and a curved point portion projecting from the longitudinal portion.

A preferred embodiment of the invention—illustrative of the best mode in which applicant has contemplated applying the principles—is set forth in the following description and shown in the drawing and is particularly and distinctly pointed out and set forth in the appended claims.

BRIEF DESCRIPTION OF THE DRAWING

FIG. 1 is a side elevation of the power cultivator of the present invention;

FIG. 2 is a top plan view, partly in section, taken along the line 2-2 in FIG. 1, showing the belt drive and digging boom;

FIG. 3 is a horizontal section, partly broken away, taken on the line 3-3 in FIG. 1;

FIG. 4 is a vertical section taken on the line 4-4 in FIG. 1; and

FIG. 5 is a vertical section taken on the line 5-5 in FIG. 1.

DESCRIPTION OF THE PREFERRED EMBODIMENT

The power cultivator construction of the present invention includes a frame member generally indicated at 10 having a preferably gasoline powered engine 11 mounted thereon by any suitable means such as nut and bolt assemblies 12. Engine 11 includes a shaft member 13 extending downwardly along a generally vertical axis, and a pulley member 14 is mounted on shaft 13 by any convenient and usual method.

The frame member 10 includes a generally U-shaped portion 15 which may be doubled back upon itself as at 16 to form a pair of generally parallel shaped mounting members to serve as a means for mounting the entire cultivator assembly. Handle means 17 has one end attached to the frame and the other end attached by any convenient means to the engine. A throttle 18 may be mounted upon the handle to control the speed of the engine which in turn controls the speed of the digging portion of the cultivator construction.

Plate member 19 is mounted on the frame and extends between the U-legs 15, and a corresponding plate member 20 is mounted on and extends between the folded back U-legs 16. Plates 19 and 20 serve to supply strength to the frame members and as a means for mounting the digging arm assembly to the cultivator construction.

The cultivator includes a pair of generally parallel spaced upper and lower elongated sprocket mounting arms 21 and 22 which are mounted on lower plate 19 and upper plate 20 as for example by nut and bolt assemblies 23. Shaft 25 extends through a hole provided in the outer portion of upper and lower sprocket arms 21 and 22. A portion of shaft 25 extends a distance above the top of sprocket mounting plate 21 and is provided with a second pulley 26 which is attached to shaft 25 by any usual manner and is keyed thereto by conventional means. A belt 27 extends between and around pulleys 14 and 26. Thus, operation of the engine will drive pulley 14 which will in turn drive pulley 26 by belt 27. It should be understood that any other conventional means for driving shaft 25 could be employed providing the speeds of operation were proper and correct for the circumstances under which operation was being conducted. The lower end of shaft 25 extends below lower sprocket mounting arm 22 and may be provided with a washer and nut assembly 28 to retain the shaft in place on the assembly.

The cultivator construction also includes upper arm 29 and lower arm 30 which are attached to and extend outwardly from upper and lower sprocket mounting arms 21 and 22. A sprocket 31 is mounted on shaft 25 between upper arm 29 and lower arm 30 and between upper sprocket mounting arm 21 and lower sprocket mounting arm 22. Sprocket 31 is rigidly attached to shaft 25 by any conventional means so that shaft 25 may drive sprocket 31.

A second sprocket 32 is mounted at the outer end of upper and lower arms 29 and 30 by shaft 33. Shaft 33 extends between the two arms 29 and 30 and is located within slot 34 which is formed in both of the arms 29 and 30.

A conventional endless chain 35 extends between and around sprockets 31 and 32. Chain 35 carries a series of cutting teeth to be described more in detail below. Chain backing member 37 is mounted between upper and lower arms 29 and 30 and extends between sprocket 31 and sprocket 32 to provide backing for the chain as well as a bearing surface for the chain during travel. Backing member 37 is elongated in shape and its outer edge on both sides is slightly bulged as at 38. Chain 35 which is driven by sprocket 31, will have a slight amount of play. That is the chain 35 will not be mounted between the two sprockets with a substantial amount of tightness or tension. The bulge in backing members 37 will therefore provide a bearing surface for the chain 35 as chain 35 travels around the sprockets and between the same during operation of the cultivator unit.

The backing member also includes a relatively narrow groove 39 which runs along the entire length of each edge. A bearing member 40 is mounted within the groove 39 on each edge and is formed of some suitably strong and wear resistant material such as brass or bronze or steel. Bearing member 40 is thick enough so that it extends above the surface of each edge of backing member 37 and provides a surface upon which chain 35 travels.

Chain 35 which as indicated above is of a conventional type, includes link portions and roller portions surrounding the pins connecting the links. Thus, as the chain passes over bearing member 40 the rollers which constitute a portion of the standard chain tend to roll over bearing member 40. The thickness of bearing member 40 is approximately enough to compensate for the additional width of the links of the chain which in the usual case is wider than the diameter of the rollers of the chain.

A series of cutting teeth generally indicated at 41 are mounted at spaced intervals along the chain 35. Cutting teeth 41 include a mounting link portion 42, a base portion 43 and a tooth portion 44. Mounting link portion 42 is provided with a pair of holes so that it may be substituted for one of the pair of connecting links of the standard chain at the position where the teeth are mounted. The base portion 43 may be connected to the mounting link portion 42 by riveting or any other conventional means. Tooth portion 44 may be formed as an integral part of base portion 43 or it may be welded to the base portion 43 of tooth 41.

In accordance with the invention tooth portion 44 is generally elongated in shape and includes a sharpened point or tip 45 which during operation of the cultivator serves to cut through the dirt or other material which is being dug. Further, in accordance with the present invention, at least one of the teeth members 41 includes a second toothlike portion 46 which is generally curved or talon-shaped and which is mounted on the tooth member 44. Talon-shaped portion 46 may be welded to tooth portion 44 if desired or the whole structure, that is, base member 43, tooth portion 44 and talon-shaped portion 46 may be fabricated out of one piece of material. Thus, at least one of the teeth on the cultivator unit is comprised of a compound tooth assembly consisting of the elongated tooth portion 44 and the talon-shaped portion 46. The purpose for providing such a compound form tooth will be described more in detail below during the description of the operation of the machine.

Sprocket 32 is mounted for rotation about shaft 33 and is provided with a bearing 47. Bearing 47 may be of any conventional type such as a roller or ball bearing or it may be a needle type bearing constructed of a material such as oil brass. Shaft 33 extends at each end above and below upper arm 29 and lower arm 30. The end of shaft 33 may be threaded to receive nuts 48 which form a part of a sprocket adjustment assembly.

The sprocket adjustment assembly includes a yoke member 49 which has one end thereof notched as at 50 to provide a yoke which fits around shaft 33. A threaded stud 51 is mounted within adjusting nut 52 which is welded to yoke member 49. Additionally, yoke member 49 is provided with an elongated slot 59 through which bolt 53 passes. The adjustment of sprocket 32 is accomplished by loosening nut 55 which is threadably engaged on bolt 53 to allow movement of yoke member 49. The yoke member 49 is urged outwardly to move shaft 33 which is slidable in slot 34 to the position where the proper degree of tension is on chain 35. Bolt and nut assembly 53 and 55 are then tightened to temporarily hold yoke member 49 in position. A second hole may then be drilled completely through the entire arm assembly and a second nut and bolt assembly 56 may be placed through the hole and tightened to hold yoke member 49 with respect to upper arm 29 and lower arm 30. It should be understood that a yoke type adjusting assembly is provided at both the top and the bottom of the arm assembly. That is, one yoke assembly is mounted on upper arm 29 and an identical yoke assembly is mounted on the lower arm 30. Thus, it is possible to provide equal adjustment for both the top and the bottom of shaft 33.

As an aid in adjusting the tension on chain 35, the threaded stud 51 may be turned to move it inwardly toward sprocket 31 or outwardly away from sprocket 31 to increase or decrease the tension on the chain. Threaded stud 51 and nut assembly 52 can in and of itself provide the necessary adjustment for sprocket 32 if desired, however, it is preferably to provide the bolt assemblies 52 and 53 together with the bolt assembly 56 to afford added strength to the unit.

The arm portion may also be provided with a shield 57 to protect the interior space of the arm from accumulating dirt, and to provide a means of protecting small stones and the like from too easily falling into the sprockets where they could cause damage or injury.

OPERATION OF THE PREFERRED EMBODIMENT

The cultivator construction of the present invention operates by providing power to shaft 13 which through belt and pulley assemblies 14, 26 and 27, in shaft 25, drives sprocket 31. Sprocket 31 in turn drives chain 35 upon which cutting teeth 41 are mounted. During operation of the engine the chain 35 will continuously orbit about sprockets 31 and 32.

The operator of the machine may place the outer end of the arm at the point in the ground where he desires to dig, and as the chain continuously moves about sprocket 31 and 32 the cutting teeth will continuously cut into and dig the earth or dirt. The pointed end 45 of teeth members 41 will continuously cut into and loosen the dirt as the chain orbits. The compound teeth which include both the elongated teeth 44 and the talon-shaped portion 46 will tend to cut a larger swath through the dirt as the tooth passes through the portion of ground where it is performing work. The talon-shaped portion together with the elongated tooth 44 will tend to scoop up bits of dirt and remove the same from the area where digging is occurring. Thus, in addition to cutting through the dirt the compound teeth which comprise one aspect of the present invention, provide a means of removing dirt.

A further advantage in the compound teeth is their ability to help move the machine through dirt as it is cutting a swath. For example, the operator of the machine to move the machine from right to left or left to right need merely only exert a small amount of pressure on the handle portion in the direction in which he wishes to travel. The talon-shaped portions 46 will either aid in pulling the machine in that direction if moving from right to left or will remove enough dirt in the path of travel when moving from left to right to facilitate easy movement.

A typical example for the use of a machine of the present invention might involve a commercial nurseryman who might desire to dig and ball a quantity of bushes or trees. The operator of the machine would merely need to insert the operating machine to the proper depth in the ground and move in a circular path around the base of the bush being dug. The operator of the machine would then have cut a circular shaped trench around the base of the tree and it could be easily removed with a ball of dirt remaining around the roots of the plant. Other uses for the machine are apparent. For example, the cultivation of ground for a garden could easily be accomplished by moving the machine in short paths from left to right to cultivate a wide path of dirt several feet wide.

In actual operation of the machine I have found that a three-horsepower gasoline powered engine operating at about 1,600 to 1,800 r.p.m. will easily cut through the most compacted dirt. Thus, the machine can easily perform jobs which are normally done with a hand pick.

The advantages of the present construction and important aspects thereof involve the provision of the unique compound teeth for accomplishing the dual purpose of cutting through hard and soft dirt and removing dirt from the area where digging is occurring. Other aspects of the invention involve the unique construction which provides for adjustment of the sprocket and the unique backing construction which provides a means of allowing the proper amount of play in the chain while at the same time providing a backing for the chain while the chain is performing its cutting work.

The improved cultivator construction of the present invention is simple, efficient and inexpensive to construct, provides a small, portable power cultivator which can be hand operated, and provides a portable cultivating machine which is capable of performing functions not heretofore performed by other machines of the prior art.

In the foregoing description certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of construction shown or described.

Having now described the features, discoveries and principles of the invention, the manner in which the improved construction is assembled and operated, and advantageous, new and useful results obtained thereby, the new and useful structure, elements, arrangements, parts and combinations and mechanical equivalents obvious to those skilled in the art, are set forth in the appended claims.

I claim:

1. Power cultivator construction including a frame, an engine mounted on the frame, sprocket mounting means attached to and extending from the frame, a first shaft rotatably mounted on the mounting means, a sprocket mounted on the first shaft, drive means between the engine and the shaft for driving the shaft and sprocket by the engine; an upper arm and a lower arm attached at one end to and extending outwardly from the mounting means to form a boom, said arms being spaced from each other, a second sprocket mounted for rotation at the outer end of the arms, an endless chain extending between and around the two sprockets, a plurality of cutting tooth means mounted on the chain at spaced intervals, chain backing means located between the arms and extending between the sprockets, the backing means including a chain bearing member having a bearing surface, at least one of the tooth means being a compound tooth having first and second working portions, and means for adjusting the second sprocket positioned to permit adjustment of the chain tension, in which the compound tooth means first portion includes an elongated portion mounted at one end upon the chain and extending in the direction of the chain travel and terminating in a point, and in which the tooth means second portion includes a curved talon-shaped portion extending from and at an angle with the elongated portion.